Figure 1:
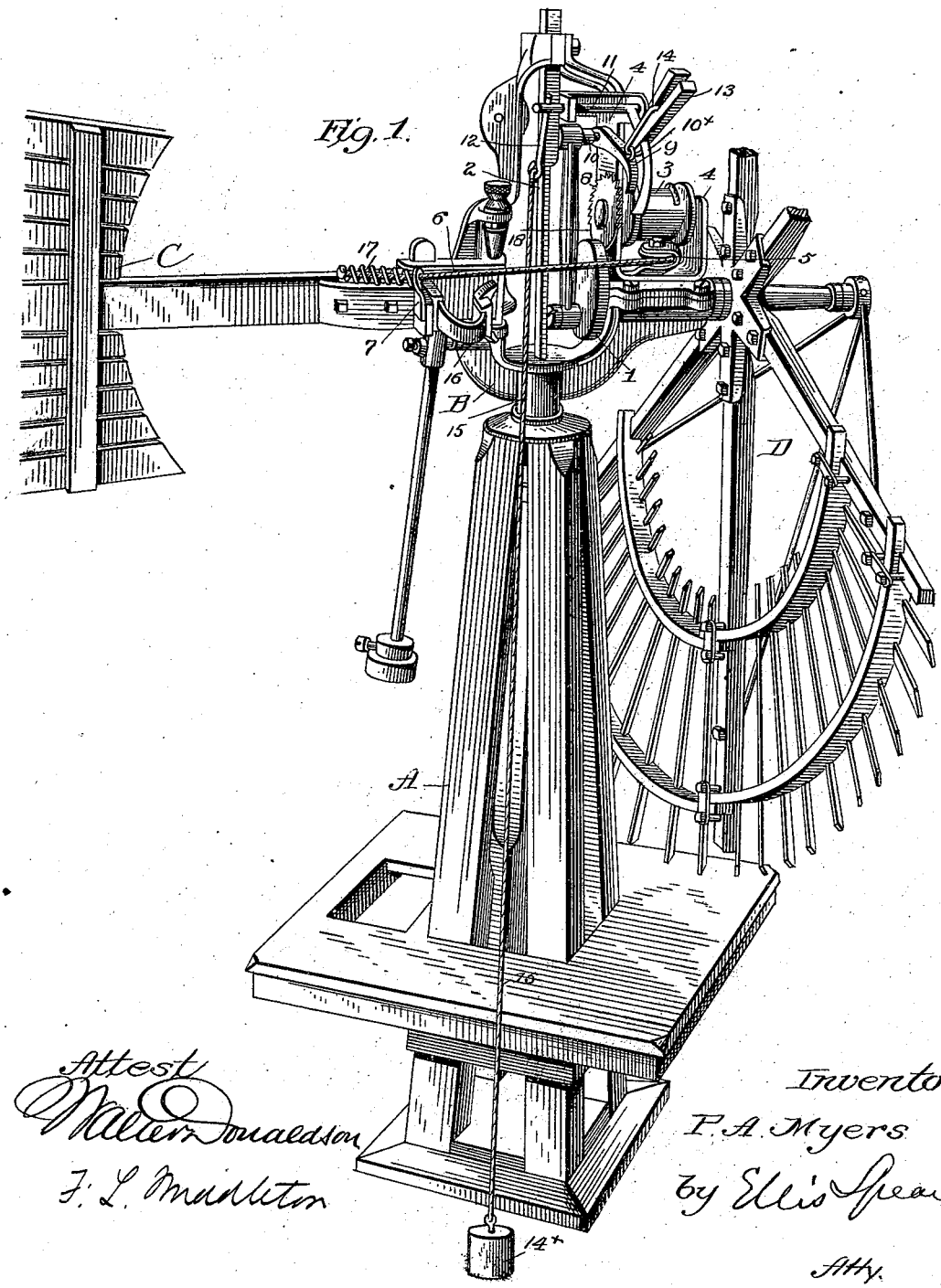

(No Model.)  3 Sheets—Sheet 1.

P. A. MYERS.
WINDMILL REGULATOR.

No. 501,355. Patented July 11, 1893.

Attest  
Walter Donaldson  
F. L. Middleton

Inventor  
P. A. Myers  
by Ellis Spear  
Atty.

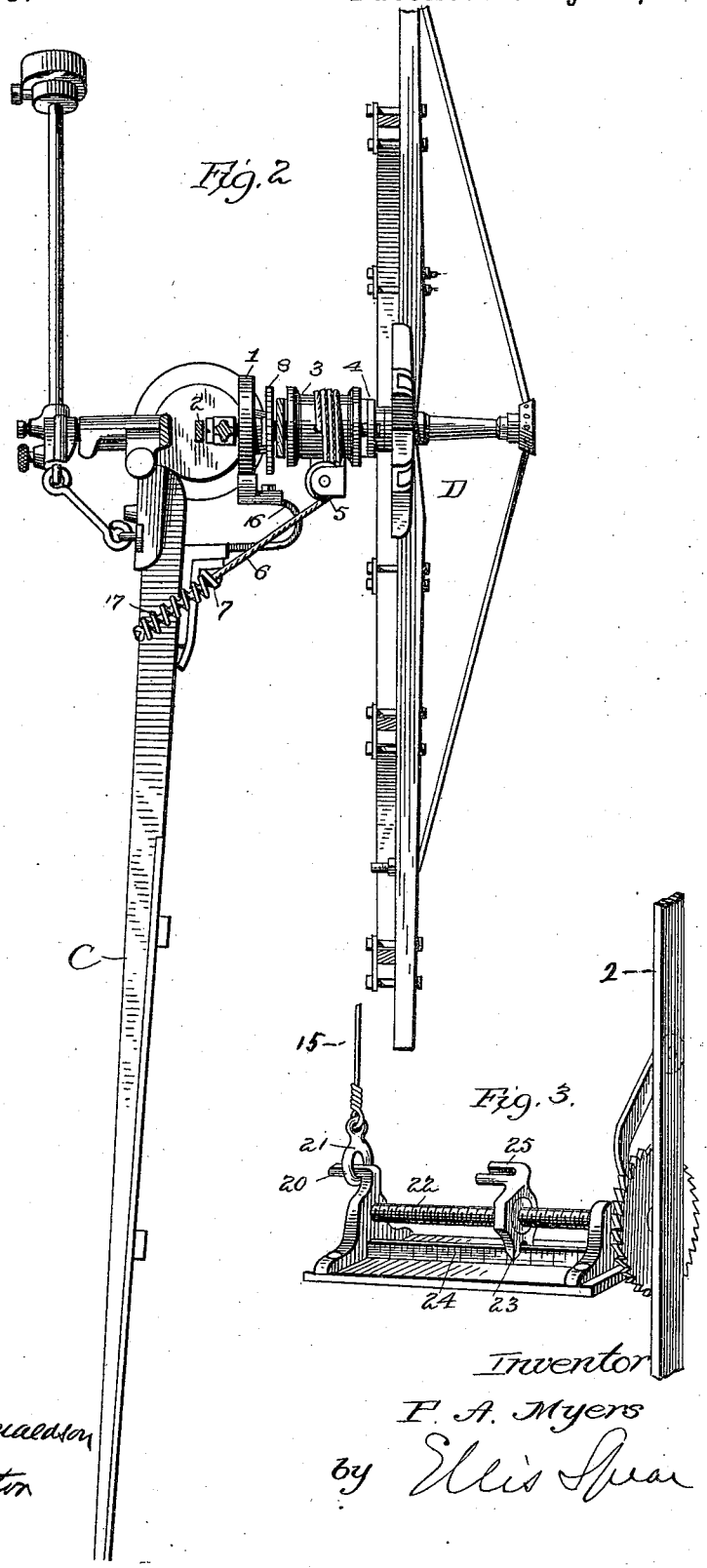

(No Model.)
P. A. MYERS.
WINDMILL REGULATOR.
No. 501,355.
3 Sheets—Sheet 3.
Patented July 11, 1893.
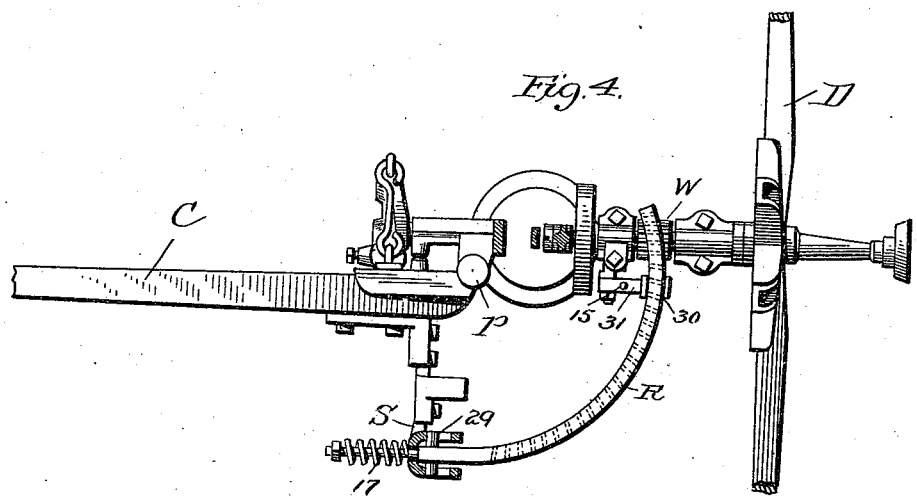
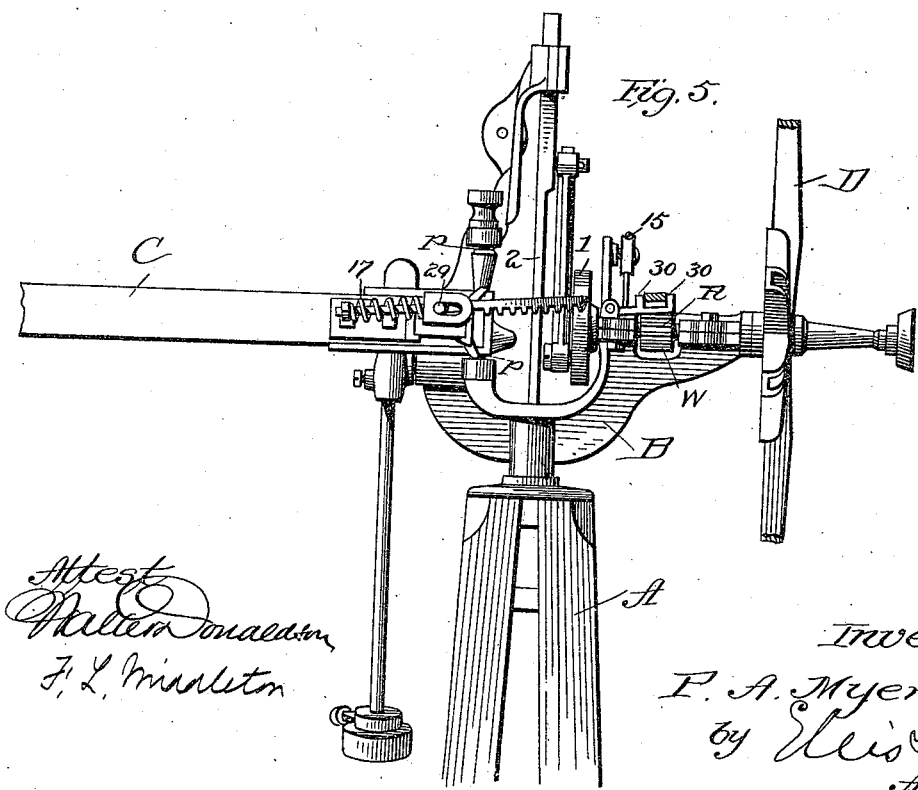

UNITED STATES PATENT OFFICE.

PHILIP A. MYERS, OF ASHLAND, OHIO.

WINDMILL-REGULATOR.

SPECIFICATION forming part of Letters Patent No. 501,355, dated July 11, 1893.

Application filed April 6, 1891. Renewed March 31, 1893. Serial No. 468,579. (No model.)

*To all whom it may concern:*

Be it known that I, PHILIP A. MYERS, a citizen of the United States of America, residing at Ashland, in the county of Ashland and State of Ohio, have invented certain new and useful Improvements in Windmill-Regulators, of which the following is a specification.

My said invention is of that class of wind engine regulators, in which the force of the wheel is utilized to turn itself or its planes or sections out of the wind. In regulators of this class the power of the wheel has been controlled by a float, by the rising or falling of which the connections are made or broken between the wheel and the mechanism through which the wheel and vane are brought into parallel planes.

My invention is adapted to be used in the same manner and to be controlled by the agency of a float, but it may also be controlled by a hydraulic diaphragm, or hydraulic cylinder, or other mechanisms, or by a weight adapted to be manipulated by the hand. It is especially adapted to be combined with a brake, for the purpose of holding the wheel rigidly, when turned out of the wind, and thus avoid the pumping of water after the wheel has been thus turned out, this in cold climates being especially objectionable for the reason that when so moved the wheel continues just sufficient pumping to maintain water in the pump where it is subjected to freezing. I have shown the combination of a brake with the devices for turning the wheel out of the wind, so that the same power which turns and holds the wheel out of the wind applies the brake and arrests the wheel.

The main feature of my invention consists in the direct combination of the regulating devices with the main frame of the machine whereby the strain is taken from the pump platform, and the regulating device is not disturbed by the racking or variations of the derrick, as in the case with regulating devices placed below the main frame. The combination of the regulator mechanism with the main frame of the engine enables the manufacturer to build the whole in complete fixed form, with all the parts of the regulator mechanism in their proper positions, so that when the wind engine is mounted upon the tower, no special skill is required to adjust the regulator mechanism, as is the case with those placed upon and including the tower. In this direct combination of the regulator with the main or wheel frame, the connections of the wheel with the vane or equivalent governor, by means of which the force of the wheel is made to turn the wheel out of the wind are direct, and do not include the tower as heretofore. Such connections may be of various kinds but are in all cases capable of disconnection, so that the wheel may be engaged or disengaged with the vane or governor, and combined with connections thus capable of disengagement is a controlling device, whereby the wheel and governor may be engaged or disengaged as hereinafter explained. My invention includes also details of construction as hereinafter explained.

My invention is illustrated in the accompanying drawings in which:

Figure 1 is a perspective view of the wind engine and the regulator attachment. Fig. 2 is a plan view of the same with a portion of the upper structure removed. Fig. 3 is a detail perspective view of a device by which the wheel may be thrown out of the wind after making a certain number of revolutions to do a predetermined amount of work. Fig. 4 is a plan view of a modification, and Fig. 5 a side view of the same.

In the drawings is shown an ordinary tower or derrick A on the top of which is mounted a main or wheel frame B carrying the pivoted vane or governor C on one end and the wheel D on the other. The face plate on the inner end of the wheel shaft is shown at 1 and this is connected by wrist pin and pitman to the pump rod 2. These parts are all of old construction, and represent any of their class. Upon the main or wheel frame, above the bearings of the main shaft I have mounted a drum 3 in suitable standards 4. A guide pulley 5 on one side, guides the rope or chain 6 one end of which is attached to the drum, and the other to a stud 7 on the shaft of the vane. The stud is sufficiently aside from the line of the shaft, to give the necessary leverage upon the vane. The drum shaft carries on its inner end a ratchet wheel 8. This is operated by means of a pawl 9 pivoted upon a pin 10 set in the upper end of the pump rod, this being (as shown) the same as that to which the upper end of the pitman is connected. The teeth of the ratchet wheel are so set, that when the pump rod descends, the pawl may engage therewith, and move the drum, the pawl riding over the teeth when the rod rises. This is a convenient connection for the pawl but, without departing from the spirit of the invention the pawl may be operated by the rotation of the shaft through any convenient mechanism. In fact provided the connection be placed upon the main frame of the engine and connect the shaft and the vane or other governor, for the purpose of my invention it may be a drum and rope or any mechanical equivalent therefor, so long as it serves to transmit the power of the shaft to the vane, to turn the wheel out of the wind, this connection on the main frame requiring as in other regulators to be made capable of engagement and disengagement and requiring also controlling devices for said engagement and disengagement.

The particular construction shown is as follows: Upon an extension of one of the drum supporting standards, is mounted a holding pawl $10^\times$. It is fixed to a rock shaft 11 on the end of which is an arm 12 by means of which the retaining pawl may be held out of engagement. The holding pawl is connected to the retaining pawl, so that it may have free independent play but be held out of engagement by the retaining pawl. An arm 13 is fixed to the retaining pawl extending outward. This serves as a weight and it is slotted to receive a link 14 which is connected with the push pawl. The pawls engage the ratchet wheel by gravity, or automatically. A spring may be used according to the same principle. Any force applied to hold the pawls out of engagement with the ratchet wheel will permit the wheel to run in the wind. The most convenient means for exerting such force is a weight, as 14 suspended from the arm upon the rock shaft, by means of a cord 15. This exerts a constant and uniform force, and holds the pawls away from the ratchet wheel. When the weight is lifted and the cord slackened, the pawls being released, fall automatically into engagement with the wheel. The engagement of the connections between the wheel shaft and the vane or regulator is then controlled by the lifting of the weight which may be lifted in various ways as hereinafter described. The regulator therefore consists essentially of two parts, one of which represented in the construction above described, by the pawls, and their connection with the wind wheel shaft, directly exerts upon the other, power derived from the shaft, these devices being separable from the other, and serving, when in connection with the said other part, to operate upon the vane or governor. The other part represented by the drum and its appendages, including direct and positive connection with the vane, transmits, when in connection, said power to the vane or governor. Substantial equivalents for these parts may be used, as hereinafter explained. It is obvious also that these controlling devices by which connection may be made or broken between the wheel shaft and vane may be greatly varied. The reciprocating movement of the mechanism which operates the pump rod works the pawl, and thus turns the drum winding up the cord thereon, and pulling the wheel out of the wind.

Upon an offset on the vane shaft is the brake 16 which bears upon the periphery of the face plate and thus acts as a brake. When the wheel is pulled out of the wind by hand, the only force exerted upon the brake, is that applied by the person pulling the wheel, and heretofore this force has been found not sufficient and cannot be properly applied, to retain pressure of the brake.

In my invention the full force of the wind is suddenly applied to the regulating device, and the momentum is sufficient to bring the wheel around forcibly and thus to cause the brake to bear firmly upon the face plate, and the pawls remaining in engagement, the brake is held in this position. In order to take up any shock, and to store up power adapted to react upon the brake, I provide a spring 17 in connection with the rope. This may be conveniently applied by using a coiled spring around the rope, being held between a knot on the end, and the bearing on the stud. The brake is locked upon the face plate with a firm spring pressure, as long as the pawl engages with the ratchet wheel. All the strain is between the main frame of the engine and the vane shaft, and the regulating device may be applied to any ordinary form of wind engine. The release of the pawls may be accomplished in several ways. When the rope and weight are used and the tank is near, the weight may be in the form of a float, and rests upon the surface of the water in the tank; so long as the water is low, the weight hangs by the rope and holds the pawl out of engagement. But when the water reaches its maximum level it lifts the weight and releases the pawls, thus causing the wheel to act upon the drum and turn itself out of the wind.

Where it is required to force the water to some point above the level of the pump, the rope which controls the pawls may be connected with a diaphragm or a hydraulic cylinder, receiving pressure from the pump or its pipe connections, the pressure being regulated by a float controlling a valve in the tank, in manner well known to those skilled in this art. If an automatic release be not desired the weight may be manipulated by hand, it being necessary only when the mill is to be stopped to hang up the weight. The only arrangement required, in this case, is that the weight when hanging free shall be sufficient to hold off the pawls; and when the weight is lifted off, or hung up, the wheel is free to turn itself out of the wind, and to automatically apply and hold its own brake. In connection with the mode of use, I have devised a mechanism which may be set by hand for operating the wheel any required number of revolutions or for any required amount of work. This is shown in Fig. 3. A stud 20 is fixed at some conveniently accessible point, and is adapted to receive and hold a ring or loop 21 on the lower end of the cord which controls the pawls. A screw shaft 22 turns in bearings in line with this stud and carries a nut as it turns, the nut being prevented from turning by the fingers 23 which straddle the rib 24. The nut also carries prongs 25 which when the dog reaches the limit of its advance, push off and release the ring of the cord, and allow the regulator to turn out the wheel. On one end of the screw shaft is a ratchet wheel operated by a pawl on the pump rod. The rib is graduated to indicate units of any required kind, as barrels of water which the pump would raise while the dog moves over one of these units. The nut may be made in well known ways, so that it can be set at any point. If the nut be set with the fingers at 60 for example the wheel will be allowed full operation until the nut moves to the other end and pushes off the ring. In order that there may be no further strain upon the mechanism after the wheel has been turned out and power gained to apply the brake I limit the action of the ratchet wheel by interposing a plain periphery, as shown at 18. The ratchet portion of the periphery is made of a length sufficient to turn out the wheel and apply the brake and the parts are so adjusted that the push pawl reaches the end of the teeth, when this has been accomplished. After that if the wheel should turn it would be without effect on the drum, as the pawl will simply reciprocate over the plain surface of the wheel.

I am aware that I am not the first to devise a regulator operated by the force of the wheel, with intermediate connections operated by a float, for throwing the regulator into engagement with the wheel, and I limit myself, in this particular, to the combination of such a regulator with the main frame of the wheel, but I do not in respect to this combination limit myself to the particular form of regulator.

The device for throwing off the weight after a given time, is applicable to wind engines, not having my regulator device. For example in wind mills now in use, the wheel is pulled out of the wind, by direct pull upon the rope. It requires about fifty pounds of force on the rope for this purpose, and the pull is directly on the wheel. This fifty pounds weight may be suspended on the stud 20 leaving the rope slack and may be pushed off in the same way and as it falls it pulls on the cord and draws the wheel out of the wind.

I have stated that the particular mechanism located on the wheel frame for drawing together the head and frame and thereby pulling the wheel out of the wind is not the essential part of my invention. I have shown in Figs. 4 and 5 another form of regulating connection in the same combination, detachable from the main shaft but when attached thereto controlling the vane shaft. In this form the main operating part of the regulator consists of a gear wheel W fixed on the main shaft, on the frame. A curved rack bar R is attached to the arm S on the vane shaft by means of the spring 17 bearing on the parts in the same manner as this spring bears in Figs. 1 and 2. The rack bar is on a curve struck from the vane pivot $p$. The bar is mounted on trunnions 29 so that it may swing up and down, the trunnions being in slots, to allow the spring action. When the bar is in mesh with the wheel W the wheel will draw itself out of the wind and when out of mesh the wheel so held runs free. The bar is held in guides 30 on a pivoted arm 31 and to this the cord or wire 15 is attached and the rack bar is lifted and lowered as the pawl in the other form and with the same effect. Other forms may be devised in place of the connections shown.

In the description above given I have shown the application of my invention to the class of wheels controlled by a vane but it will be obvious that it is equally applicable to the wind engines having other forms of governors and to sectional wheels as well as to solid wheels, and when the invention is applied to wheels having another form of governor whether it be a weight or spring used instead of a vane to hold the wheel into the wind, the connection is made to such weight or spring instead of the main shaft and the operation is precisely the same the weight and spring being known equivalents for the vane. The operation is the same when the regulator holds a section of a sectional wheel into the wind as in this case the governor is thrown into connection with the shaft and thus operated by the wheel which serves to pull upon the governor and to feather the wind surfaces.

I claim as my invention—

1. In combination, in a wind engine, a wind wheel, movable into and out of the wind, a vane or governor therefor, a two part regulator, the two parts being constructed to engage with each other, and to be disengaged; and when engaged, connecting the wind wheel operatively with the vane or governor, said regulator being mounted on the wheel frame; and a mechanism for engaging and disengaging the two parts of the regulator, substantially as described.

2. In combination in a wind engine, movable into and out of the wind, a two part regulator mounted directly upon the wheel frame, one of the said parts being connected to the wheel shaft and moving constantly therewith, and normally out of engagement, but adapted automatically to engage with the other part; and the other part being normally inactive and connected directly with the vane or governor; and a controlling device, arranged to hold the parts normally out of engagement, and to permit engagement, substantially as described.

3. In combination with the rope of a wind engine regulator, a screw shaft operated by the engine, means for holding the rope and a nut traveling on the screw shaft and arranged to release the rope.

In testimony whereof I affix my signature in presence of two witnesses.

PHILIP A. MYERS.

Witnesses:
F. B. KELLOGG,
J. E. MCDOWELL.